(12) United States Patent
Lysenkov

(10) Patent No.: US 10,311,283 B2
(45) Date of Patent: Jun. 4, 2019

(54) REAL-TIME FEEDBACK SYSTEM FOR A USER DURING 3D SCANNING

(71) Applicant: Ilya Lysenkov, Nizhny Novgorod (RU)

(72) Inventor: Ilya Lysenkov, Nizhny Novgorod (RU)

(73) Assignee: Itseez3D, Inc., Santa Clara, CA (US)

( * ) Notice: Subject to any disclaimer, the term of this patent is extended or adjusted under 35 U.S.C. 154(b) by 144 days.

(21) Appl. No.: 15/287,979

(22) Filed: Oct. 7, 2016

(65) Prior Publication Data

US 2017/0103255 A1    Apr. 13, 2017

Related U.S. Application Data

(60) Provisional application No. 62/238,460, filed on Oct. 7, 2015.

(51) Int. Cl.
*G06K 9/00* (2006.01)
*G06K 9/22* (2006.01)
*G06T 7/521* (2017.01)

(52) U.S. Cl.
CPC ..... *G06K 9/00255* (2013.01); *G06K 9/00369* (2013.01); *G06K 9/228* (2013.01); *G06T 7/521* (2017.01)

(58) Field of Classification Search
CPC ... G01N 2015/1445; G01N 2015/1447; G01N 2021/1785; G01N 2021/1787; G01N 2021/1782; G01N 2021/178; G01N 2021/8829; G01N 2021/8832; G06K 9/00208; G06K 9/00201; G06K 9/00214; G06K 9/00221; G06T 3/40; G06T 3/4007; G06T 3/403; G06T 3/4023; G06T 3/4038; G06T 3/4084
USPC ............... 382/154, 152, 285, 108, 131, 312, 382/318–319, 118; 128/915–916; 345/420–428
See application file for complete search history.

(56) References Cited

U.S. PATENT DOCUMENTS

| | | | | |
|---|---|---|---|---|
| 6,088,040 | A * | 7/2000 | Oda | G06T 13/80 345/441 |
| 7,639,866 | B2 * | 12/2009 | Pomero | G06T 17/00 382/128 |
| 7,940,260 | B2 * | 5/2011 | Kriveshko | A61C 13/0004 345/419 |
| 2001/0038705 | A1 * | 11/2001 | Rubbert | A61C 7/00 382/128 |
| 2011/0317890 | A1 * | 12/2011 | Baroni | G06T 17/00 382/128 |

OTHER PUBLICATIONS

Google search: "A normal in each point", Dec. 11, 2018 (Year: 2018).*

* cited by examiner

*Primary Examiner* — Dwayne D Bost
*Assistant Examiner* — Stephen M Brinich
(74) *Attorney, Agent, or Firm* — VLP Law Group LLP; Kent H. Cheng

(57) ABSTRACT

The present invention provides a method for providing feedback to a user during a 3D scanning session and guides the user to finish scanning completely.

2 Claims, No Drawings

REAL-TIME FEEDBACK SYSTEM FOR A USER DURING 3D SCANNING

CROSS REFERENCE TO RELATED APPLICATIONS

This application claims the benefit of U.S. Provisional Application No. 62/238,460, filed Oct. 7, 2015, the entire content of which is incorporated by reference.

BACKGROUND OF THE INVENTION

Field of Invention

The present invention relates to a method for providing feedback to a user during a 3D scanning session and guides the user to finish scanning completely.

The device used for 3D scanning is a mobile phone or a tablet with color camera and a depth sensor such as [7], [8]. In order to obtain a 3D model of a person or an object a user has to walk around the scanned object with the mobile device. Tests with users revealed that new users often stop scanning prematurely (without capturing all parts of a scanned entity) which results in inferior scans. Moreover, even more experienced users had problems with scanning all parts of a complicated object such as a human body or a room. The present invention provides a real-time feedback system to help a user to capture all features of scanned object.

A common way to provide feedback during scanning is to show captured parts to the user [1, 2, 3] with KinectFusion [3] as an excellent example. This is useful visualization but it has a shortcoming: it doesn't encourage a user to scan parts which are not seen. For example, when scanning a human bust, if a person didn't scan a top of the head KinectFusion visualization would look perfect from all points of view encountered by the user but the final model will not have measurements corresponding to the top of the head. In our case the first component of our system will tell a user that scanning coverage is below 100% and so the scan is not complete, the second component will actually guide the user to scan the top of the head. In both cases it is much more valuable feedback in this situation than just Kinect-Fusion visualization. The closest approach to us is [4] which aims to provide a user a more valuable feedback than standard systems. However, their feedback has similar shortcoming to the standard systems that a problematic area should be in the field of view of the camera to be noticeable to the user and also their feedback is more complicated and less intuitive than the present invention.

SUMMARY OF THE INVENTION

The present invention provides two components: the first one computes and shows scanning progress, the second one guides a user in completing a scan. Each component has its own individual value and they can be used separately or together.

More specifically, the present invention provides feedback to a user during 3D scanning session and guides him or her to finish scanning completely. This is achieved by two components: the first one shows percentage of scan completion, the second one shows where a user should move to capture new parts of a scanned entity (an object, a person, a room, etc.). The components work in real-time on a mobile tablet such as iPad Air. The method improves quality of scans both for beginner and advanced users. It is also necessary for a greater user experience.

Component 1: Scanning Progress

The scanning progress is expressed in percent and varies from 0% to 100%. It is designed to represent the percent of the scanned object surface. However we cannot compute this exact measure since we don't know the object surface before it is scanned. So we design this measure just to make sure that a user scans the object from all directions. We imagine there is a known dummy object in place of the scanned object (which surface we don't know at the time of scanning) and compute percent of the scanned surface of the dummy object as if a user has been scanning it instead of the real one. The best results would be achieved when a dummy object resembles the scanned object (the ideal case if a dummy were an actual 3D model of a scanned entity). So the particular choice of a dummy depends on availability of prior information. Here are some examples of dummy object choices:

If we scan a convex object we may use a sphere as a dummy object

For tabletop object scanning (that is an object laying on a table so its bottom part cannot be captured) we may use a sphere with removed bottom part (a half-sphere)

If we scan a human bust we may use a mean human bust averaged over people of different ages, races, genders, appearance etc.

Analogously for a full human body scanning we may use a mean human full body model.

For room scanning we may use a sphere as a dummy object and place ourselves inside the sphere.

An important part of the method is an option of adding dummy objects as the scan progresses. For example, if a user scans a room and we recognize a chair in the scene, we add a dummy model of a chair, changing the total scanning progress value.

The scanning progress can be updated either every frame or for a subset of frames. Our implementation of a 3D scanner has a realtime selection of frames that are used for surface reconstruction. These frames are called keyframes and the method for choosing them is described in [9], the entire content of which is incorporated by reference.

A dummy model is represented as a 3D point cloud with a normal in each point. The algorithm works as follows (for notation we assume dummy points and their normals were transformed into the coordinate system of the current position of the 3D sensor, a normal is directed outwards when we scan the outside of a scanned object, and inwards when we scan inside such as in the case of room scanning):

1. Initially all dummy points are marked as not scanned.
2. When a new keyframe has been captured during scanning session:
   a. For each point in a dummy model:
      If the point is not marked as scanned and its projection lies inside of the current RGB and depth images and the depth of the point is in the range of the depth sensor $[r_1, r_2]$ then:
         i. Compute a ray from the point to a current camera origin.
         ii. Compute an angle between the ray and a normal of the point.
         iii. If the angle is below a threshold T we cast a vote for this point as being scanned from this keyframe.
         iv. If number of votes (summed over all keyframes) is above a threshold N then we mark the point as scanned.

b. Return the percentage of all casted votes among all possible votes ((N+1) * number of dummy points) as the scanning percentage.

The range of the depth sensor depends on the hardware, for Structure Sensor [7] we use $r_1=0.35$ m, $r_2=3$ m. We also use the values T=75 degrees and N=1.

This method ensures that if the scanning progress is equal to 100%, this means that each point was scanned from a good position (when noise of a depth sensor is lower and quality of texture is better) and several times (which allows a 3D reconstruction method to average several depth measurements for the same point and reduce noise of a depth sensor). In order to reach the scanning progress of 100% a user should capture all parts of a dummy which transitions into high coverage of the actual scanned object. For example, for a dummy sphere it means a user should capture a 360 view of it, which means the actual scanned entity has to be scanned from all of the directions too. A typical mistake a new user makes when scanning a human face is not scanning the area under the chin when a tablet has to be tilted up from below. The proposed method provides an intuitive result for this case: when using a mean bust as a dummy a user has to scan from below when in front of the human (to scan a chin in the dummy which corresponds to scanning a chin of the actual person) but the user doesn't have to scan a human from below when scanning the back of the head to achieve 100% coverage because the points on the back of the dummy's head will be scanned without tilting a sensor.

The described method does not take into account self-occlusions of the dummy model but for better results with a more complex object it should be taken into account by utilizing z-buffer, that is a point casts vote if only it is not occluded by points closer to a camera.

Component 2: Automatic Advisor for Capturing New Parts of a Scanned Object

This component utilizes the same dummy points as the component 1 and also their markings of whether a specific point has been already scanned or not. The main idea is at each moment in time we know which points are not yet captured so we can guide a user to move the scanning device in such a way that these points are captured. As an example, this idea can be implemented as follows:

There are 8 possible hints for a user what to do next with the tablet in this system: move right, move left, move up, move down, tilt right, tilt left, tilt up, tilt down. The hints are visualized with strait arrows for translation (move) and curved arrows for rotation (tilt). Each dummy point which is not yet scanned casts votes for actions that will bring a tablet closer to a pose where the point would be counted as scanned. The action with the biggest summary vote is displayed to a user as the hint how to continue the scanning session. The weight of the votes is diminished with the amount of time action has to be maintained to position the tablet for successful scanning. For example, if a user would capture 100 points if he or she moves a tablet slightly to the right but capture 200 points if he or she would go big distance to the left, then the system would advise the user to move to the right (because with small effort a tangible result would be achieved which results in the biggest summary vote for this action) and after he or she captures 100 points the user would be hinted to move to the left.

This system is very useful both for novice users and experienced ones. For example, when scanning a human bust the system would advise to move a tablet up and tilt it to scan a top of the head, very important but not obvious action for first time users. When scanning a complex object like a full human body it is hard to remember which parts were already scanned even for experienced users but the system would advise how to finish the scan completely.

REFERENCES

[1] Rusinkiewicz, S., Hall-Holt, O., & Levoy, M. (2002, July). Real-time 3D model acquisition. In ACM Transactions on Graphics (TOG) (Vol. 21, No. 3, pp. 438-446). ACM.

[2] Weise, T., Wismer, T., Leibe, B., & Van Gool, L. (2009, September). In-hand scanning with online loop closure. In Computer Vision Workshops (ICCV Workshops), 2009 IEEE 12th International Conference on (pp. 1630-1637). IEEE.

[3] Newcombe, R. A., Izadi, S., Hilliges, 0., Molyneaux, D., Kim, D., Davison, A. J., . . . & Fitzgibbon, A. (2011, October). KinectFusion: Real-time dense surface mapping and tracking. In Mixed and augmented reality (IS-MAR), 2011 10th IEEE international symposium on (pp. 127-136). IEEE.

[4] Kim, Y. M., Mitra, N. J., Huang, Q., & Guibas, L. (2013, October). Guided Real-Time Scanning of Indoor Objects. In Computer Graphics Forum (Vol. 32, No. 7, pp. 177-186).

[5] Du, H., Henry, P., Ren, X., Cheng, M., Goldman, D. B., Seitz, S. M., & Fox, D. (2011, September). Interactive 3D modeling of indoor environments with a consumer depth camera. In Proceedings of the 13th international conference on Ubiquitous computing (pp. 75-84). ACM.

[6] Kim, Y. M., Dolson, J., Sokolsky, M., Koltun, V., & Thrun, S. (2012, May). Interactive acquisition of residential floor plans. In Robotics and Automation (ICRA), 2012 IEEE International Conference on (pp. 3055-3062). IEEE.

[7] Structure Sensor http://structure.io

[8] Intel RealSense http://www.intel.com/content/www/us/en/architecture-and-technology/realsense-overview.html

[9] Ilya Lysenkov, A METHOD TO SELECT BEST KEYFRAMES IN ONLINE AND

OFFLINE MODE, U.S. Patent Application 62/151,520

The invention claimed is:

1. A method of determining by a computing device the progress of a 3-dimensional scan of an object by a 3D scanner comprising the steps of:
   a) providing a dummy model approximating in shape to the object being scanned and comprising a 3D point cloud with a normal at each point obtained from the 3D scanner;
   b) selecting keyframes from the 3-dimensional scan of the object obtained from the 3D scanner that are used for surface reconstruction;
   c) determining whether a point in the 3D point cloud has been scanned from each of the selected keyframes; and
   d) calculating by use of the computing device the percentage of scanned points to the total number of points in the 3D point cloud to determine the progress of the 3-dimensional scan of the object by the 3D scanner.

2. The method of determining by a computing device the completeness of a 3-dimensional scan of an object comprising the steps of
   a) providing a dummy model approximating in shape to the object being scanned and comprising a 3D point cloud with a normal at each point obtained from the 3D scanner;
   b) selecting keyframes from the 3-dimensional scan obtained from the 3D scanner that are used for surface reconstruction;

c) determining by use of the computing device whether a point in the 3D point cloud has been scanned from each of the selected keyframes; and
d) providing information from the computing device on what part of the object needs to be scanned so as to scan points in the 3D point cloud that have not been scanned.

* * * * *